United States Patent
Kimura et al.

(10) Patent No.: US 11,352,765 B2
(45) Date of Patent: Jun. 7, 2022

(54) CONSTRUCTION MACHINE WITH ENGINE RESTART SECTION AND HORN SWITCH AND GATE LOCK LEVER OPERATIONS

(71) Applicant: HITACHI CONSTRUCTION MACHINERY TIERRA CO., LTD., Koka (JP)

(72) Inventors: Hitoshi Kimura, Koka (JP); Junya Kawamoto, Moriyama (JP); Kohei Maeda, Kusatsu (JP); Masayuki Yunoue, Koka (JP)

(73) Assignee: HITACHI CONSTRUCTION MACHINERY TIERRA CO., LTD., Koka (JP)

( * ) Notice: Subject to any disclaimer, the term of this patent is extended or adjusted under 35 U.S.C. 154(b) by 164 days.

(21) Appl. No.: 16/492,622

(22) PCT Filed: May 31, 2018

(86) PCT No.: PCT/JP2018/020978
§ 371 (c)(1),
(2) Date: Sep. 10, 2019

(87) PCT Pub. No.: WO2018/221659
PCT Pub. Date: Dec. 6, 2018

(65) Prior Publication Data
US 2020/0048867 A1    Feb. 13, 2020

(30) Foreign Application Priority Data

Jun. 1, 2017  (JP) .............................. JP2017-109143

(51) Int. Cl.
*E02F 9/20*    (2006.01)
*B60Q 5/00*    (2006.01)
(Continued)

(52) U.S. Cl.
CPC ............ *E02F 9/2066* (2013.01); *B60Q 5/001* (2013.01); *E02F 9/2004* (2013.01); *E02F 9/226* (2013.01);
(Continued)

(58) Field of Classification Search
CPC ....... E02F 9/2066; E02F 9/2004; E02F 9/226; E02F 9/24; E02F 9/26; B60Q 5/001; F02N 11/0822; F02N 2200/106; B60K 35/00
See application file for complete search history.

(56) References Cited

U.S. PATENT DOCUMENTS

| 2006/0179830 A1 | 8/2006 | Kamon et al. |
| 2008/0077299 A1* | 3/2008 | Arshad et al. .......... E02F 9/003 701/50 |
| 2009/0326790 A1* | 12/2009 | Christen ............... F02D 41/042 701/112 |

FOREIGN PATENT DOCUMENTS

| EP | 3205862 A1 | 8/2017 |
| JP | 2000-096627 A | 4/2000 |

(Continued)

OTHER PUBLICATIONS

English translated Asakage (JP 2003307142A) (Year: 2003).*

(Continued)

*Primary Examiner* — James M McPherson
*Assistant Examiner* — Kyle J Kingsland
(74) *Attorney, Agent, or Firm* — Mattingly & Malur, PC (57) ABSTRACT

A controller mounted on a small-sized hydraulic excavator includes an engine restart section that restarts an engine when a horn switch operation determining section determines that a horn switch is operated and a gate lock lever position determining section determines that a gate lock lever is at a lock position in a case where a restart standby time determining section determines that restart standby (Continued)

time does not yet elapse after the engine is automatically stopped by an idling stop function, and a power supply stopping section that stops an electric power supply of a vehicle body when the restart standby time determining section determines that the restart standby time has elapsed.

5 Claims, 7 Drawing Sheets

(51) Int. Cl.
*E02F 9/22* (2006.01)
*E02F 9/24* (2006.01)
*E02F 9/26* (2006.01)
*F02N 11/08* (2006.01)
*B60K 35/00* (2006.01)
*E02F 3/32* (2006.01)
*E02F 3/96* (2006.01)
*E02F 9/16* (2006.01)

(52) U.S. Cl.
CPC ............. *E02F 9/24* (2013.01); *E02F 9/26* (2013.01); *F02N 11/0822* (2013.01); *B60K 35/00* (2013.01); *E02F 3/325* (2013.01); *E02F 3/964* (2013.01); *E02F 9/16* (2013.01); *E02F 9/2285* (2013.01); *E02F 9/2292* (2013.01); *E02F 9/2296* (2013.01); *F02N 2200/106* (2013.01)

(56) References Cited

FOREIGN PATENT DOCUMENTS

| | | |
|---|---|---|
| JP | 2001-173476 A | 6/2001 |
| JP | 2003-090237 A | 3/2003 |
| JP | 2003-307142 A | 10/2003 |
| JP | 2004-076257 A | 3/2004 |
| JP | 2008-180207 A | 8/2008 |
| JP | 2012-007555 A | 1/2012 |
| JP | 2013-072426 A | 4/2013 |
| JP | 2013-076381 A | 4/2013 |
| JP | 2013-113077 A | 6/2013 |
| JP | 2016-132967 A | 7/2016 |
| JP | 2017-072038 A | 4/2017 |
| WO | 2016/056490 A1 | 4/2016 |

OTHER PUBLICATIONS

Extended European Search Report received in corresponding European Application No. 18808876.9 dated Dec. 11, 2020.
International Search Report of PCT/JP2018/020978 dated Jul. 3, 2018.

* cited by examiner

CONSTRUCTION MACHINE WITH ENGINE RESTART SECTION AND HORN SWITCH AND GATE LOCK LEVER OPERATIONS

TECHNICAL FIELD

The present invention relates to a construction machine that can easily restart an engine automatically stopped when a work is not performed (at the non-working).

BACKGROUND ART

In general, a hydraulic excavator that is a representative example of a construction machine is configured by an automotive lower traveling structure, an upper revolving structure mounted on the lower traveling structure to be capable of revolving thereon, and a working mechanism that is provided on a front side of the upper revolving structure. An engine, a hydraulic pump, a control valve, and the like are mounted on the upper revolving structure. When an operator operates an operation lever, pressurized oil delivered from the hydraulic pump is supplied via a control valve to various kinds of hydraulic actuators. Thereby, the hydraulic excavator revolves the upper revolving structure and performs an excavating work of earth and sand by using the working mechanism.

A gate lock lever is provided in an entrance of a driver's seat in the hydraulic excavator for a switching operation between a lock position and a lock release position. When the gate lock lever is switched to the lock release position, a pilot signal is outputted to the control valve in response to an operation of the operation lever. Meanwhile, when the gate lock lever is switched to the lock position, output of the pilot signal to the control valve is prohibited.

At the non-working when the hydraulic excavator is not working, as the engine continues to be in an idling state, fuel is wastefully consumed and an environment of a working site deteriorates due to exhaust gases, noises or the like. Therefore, in a case where a specified time has elapsed since the gate lock lever becomes in the lock position, the engine is automatically stopped (Patent Document 1).

PRIOR ART DOCUMENT

Patent Document

Patent Document 1: Japanese Patent Laid-Open No. 2000-96627 A

SUMMARY OF THE INVENTION

Incidentally, when the hydraulic excavator restarts the work, it is preferable to generate an alarm sound from a horn to call attention of workers around and notify the workers around the hydraulic excavator of starting the engine.

However, in the hydraulic excavator according to Patent Document 1, the engine can be restarted by a reoperation of the gate lock lever. In this case, since an operator has to operate a horn switch to sound the horn before re-operating the gate lock lever, the operator possibly feels troublesome or forgets the operation of the horn switch.

The present invention is made in view of the foregoing problems of the conventional technology, and an object of the present invention is to provide a construction machine that can easily perform restart of an engine and certainly notify workers around of start of an operation.

A construction machine according to the present invention includes: an engine that is mounted on a vehicle body and serves as a prime mover; a hydraulic pump that is driven by the engine and delivers pressurized oil; a hydraulic actuator driven by the pressurized oil delivered from the hydraulic pump; a gate lock lever that is provided in an entrance of a driver's seat of the vehicle body and is switched to a lock position prohibiting a drive of the hydraulic actuator and a lock release position allowing the drive of the hydraulic actuator; a controller configured to have an idling stop function of automatically stopping the engine when a state where the gate lock lever is in the lock position lasts for a specified time; and a horn switch to be operated at the time of generating sounds to the surroundings of the vehicle body from a horn.

In a case where an elapse time after the engine is automatically stopped by the idling stop function does not yet reach a preset restart standby time, the controller is configured to perform control of restarting the engine in a state where the horn switch is operated and the gate lock lever is in the lock position, and in a case where the elapse time after the engine is automatically stopped by the idling stop function has reached the restart standby time, the controller is configured to perform control of stopping a power supply of the vehicle body.

According to the present invention, the restart of the engine can be easily performed and the start of the operation can be securely notified to workers around.

MODE FOR CARRYING OUT THE INVENTION

Hereinafter, an explanation will be in detail made of an embodiment of a construction machine according to the present invention by taking a small-sized hydraulic excavator of an extremely small revolving type as an example with reference to FIG. 1 to FIG. 7.

Figure 1:
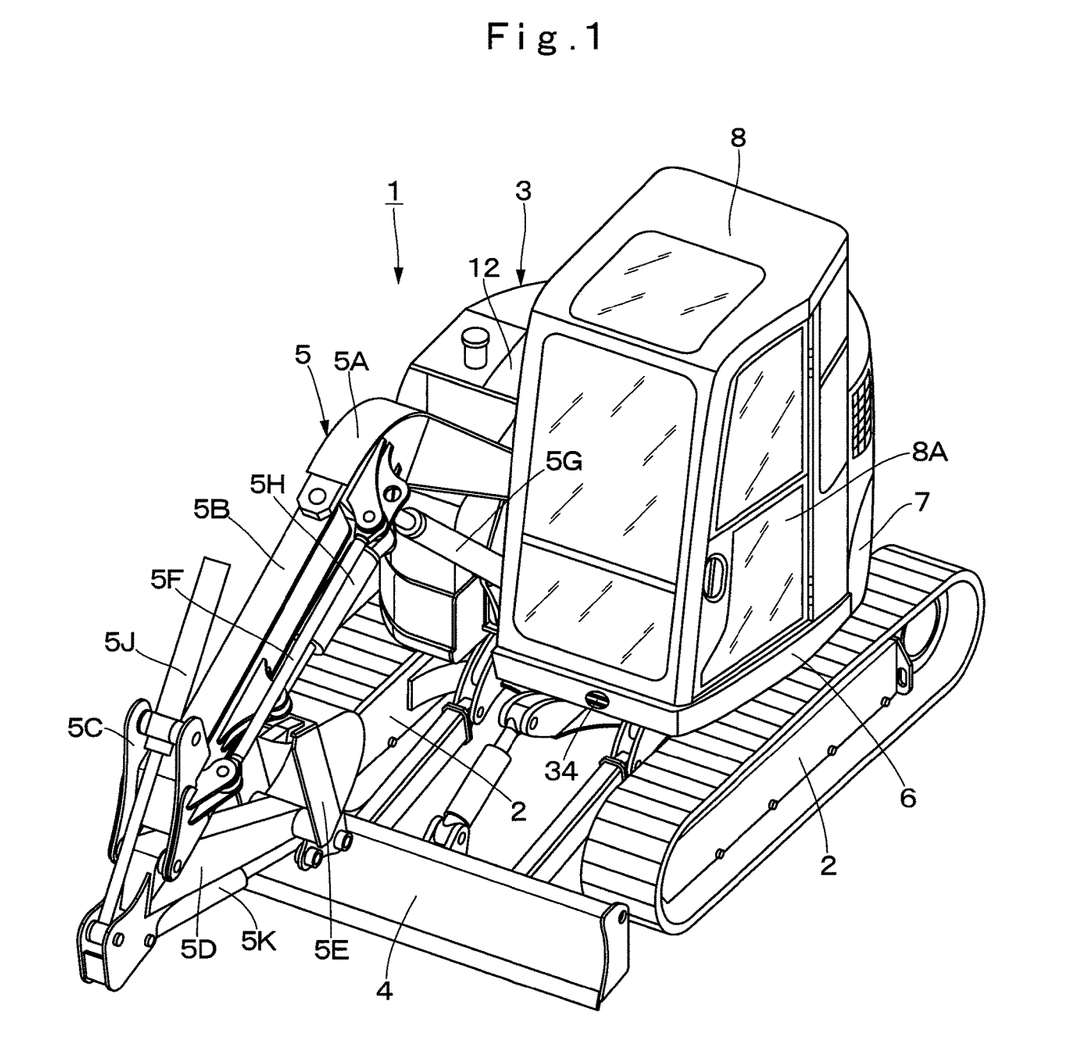
FIG. 1 is a perspective view showing a small-sized hydraulic excavator of an extremely small revolving type that is applied to an embodiment of the present invention.

In FIG. 1, a small-sized hydraulic excavator 1 of an extremely small revolving type is used for an excavating work in a narrow site, such as a side ditch digging work at the side of the road in an urban area. A machinery weight thereof is set to approximately 0.8 to 4 tons to be capable of being transported by a general truck. The small-sized hydraulic excavator 1 is provided with a vehicle body configured by an automotive lower traveling structure 2 and an upper revolving structure 3 supported on the lower traveling structure 2 to be capable of revolving thereon. A blade 4 is provided on the front side of the lower traveling structure 2. An offset front device 5 is provided on the front side of the upper revolving structure 3 to be capable of tilting up and down.

The offset front device 5 is configured by a lower boom 5A provided on the front side of a revolving frame 6 of the upper revolving structure 3 to be capable of tilting up and down thereto, an upper boom 5B mounted in a front end side of the lower boom 5A to be capable of swinging in a left-right direction, an arm support structure 5C mounted in a front end side of the upper boom 5B to be capable of swinging in the left-right direction, an arm 5D mounted in a front end side of the arm support structure 5C to be rotatable in an upper-lower direction, a bucket 5E mounted in a front end side of the arm 5D to be rotatable in the upper-lower direction, a link 5F for connection between the lower boom 5A and the arm support structure 5C, a boom cylinder 5G, an offset cylinder 5H, an arm cylinder 5J and a bucket cylinder 5K as hydraulic actuators for operating the above components.

The offset front device 5 moves the arm 5D in the left-right direction in parallel to the lower boom 5A with extension or contraction of the offset cylinder 5H. In this state, the lower boom 5A is tilted up or down while rotating the arm 5D and the bucket 5E, thus, making it possible to perform an excavating work of a side ditch and the like.

The offset front device 5 tilts up the front end side of the lower boom 5A to the most backward side and folds the arm 5D to the lower boom 5A-side, thereby, making it possible to take an extremely small revolving posture. In a state where the offset front device 5 is put in the extremely small revolving posture, when the upper revolving structure 3 is revolved, the upper revolving structure 3 and the offset front device 5 can fully revolve within a width dimension (a vehicle width dimension) of the lower traveling structure 2 in the left-right direction and within a length dimension of the lower traveling structure 2 in the front-rear direction.

The revolving frame 6 serves as a base of the upper revolving structure 3, and configures a strong support structure. The revolving frame 6 is mounted on the lower traveling structure 2 to be capable of revolving thereon via revolving wheels. A counterweight 7 is provided in the rear end part of the revolving frame 6 to act as a weight balance to the offset front device 5.

A cab 8 is provided in the left front side of the revolving frame 6. A driver's seat 9 on which an operator sits is provided in the cab 8. The cab 8 is formed in a boxy shape surrounding the periphery of the driver's seat 9. An openable and closable door 8A is provided in the left side surface of the cab 8, and the operator gets on or off the cab 8 by opening the door 8A. A later-described operation lever device 13, a gate lock lever 16, an input device 29 and the like are located in the periphery of the driver's seat 9.

The engine 10 is located closer to the front side than the counterweight 7 and is provided in back of the revolving frame 6. The engine 10 is mounted on the revolving frame 6 in a transverse-mounted state where a crankshaft (not shown) extends in the left-right direction. The engine 10 is a diesel engine (an internal combustion engine), for example, and configures a drive source that drives and rotates the hydraulic pump 11. The hydraulic pump 11 is connected mechanically to the output side of the engine 10 (refer to FIG. 6).

The hydraulic pump 11 is driven and rotated by the engine 10, and configures a hydraulic source together with a hydraulic oil tank 12 provided in the right side of the cab 8 across the offset front device 5. The hydraulic pump 11 is configured by, for example, a variable displacement type of a swash-plate, a bent-axis or a radial piston hydraulic pump or the like, and suctions hydraulic oil from the hydraulic oil tank 12 and delivers this hydraulic oil as high-pressure pressurized oil. The pressurized oil delivered from the hydraulic pump 11 is supplied to a hydraulic actuator 19 via a later-described directional control valve 22.

Figure 2:
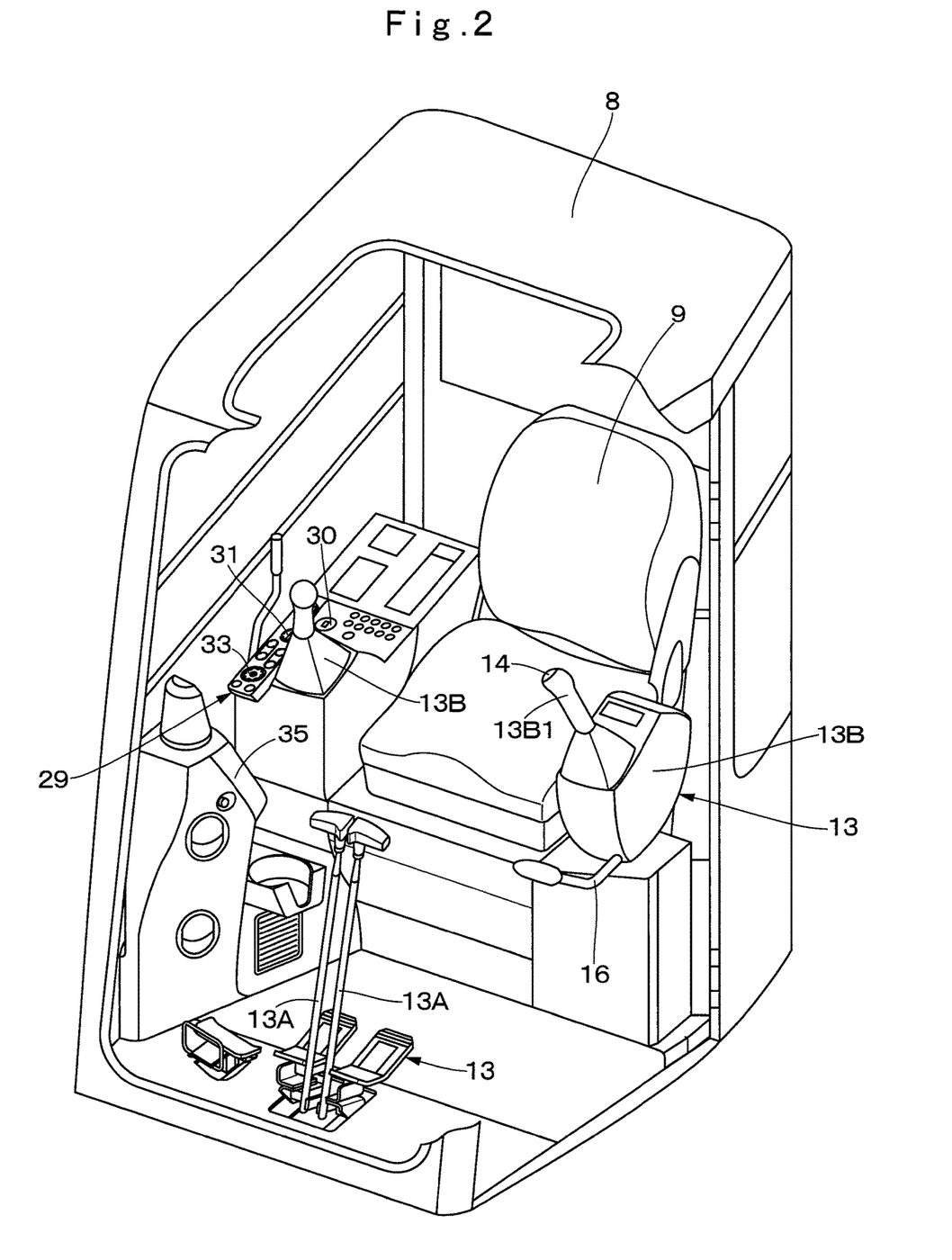
FIG. 2 is a partial broken external perspective view showing an inner part of a cab.
Figure 3:
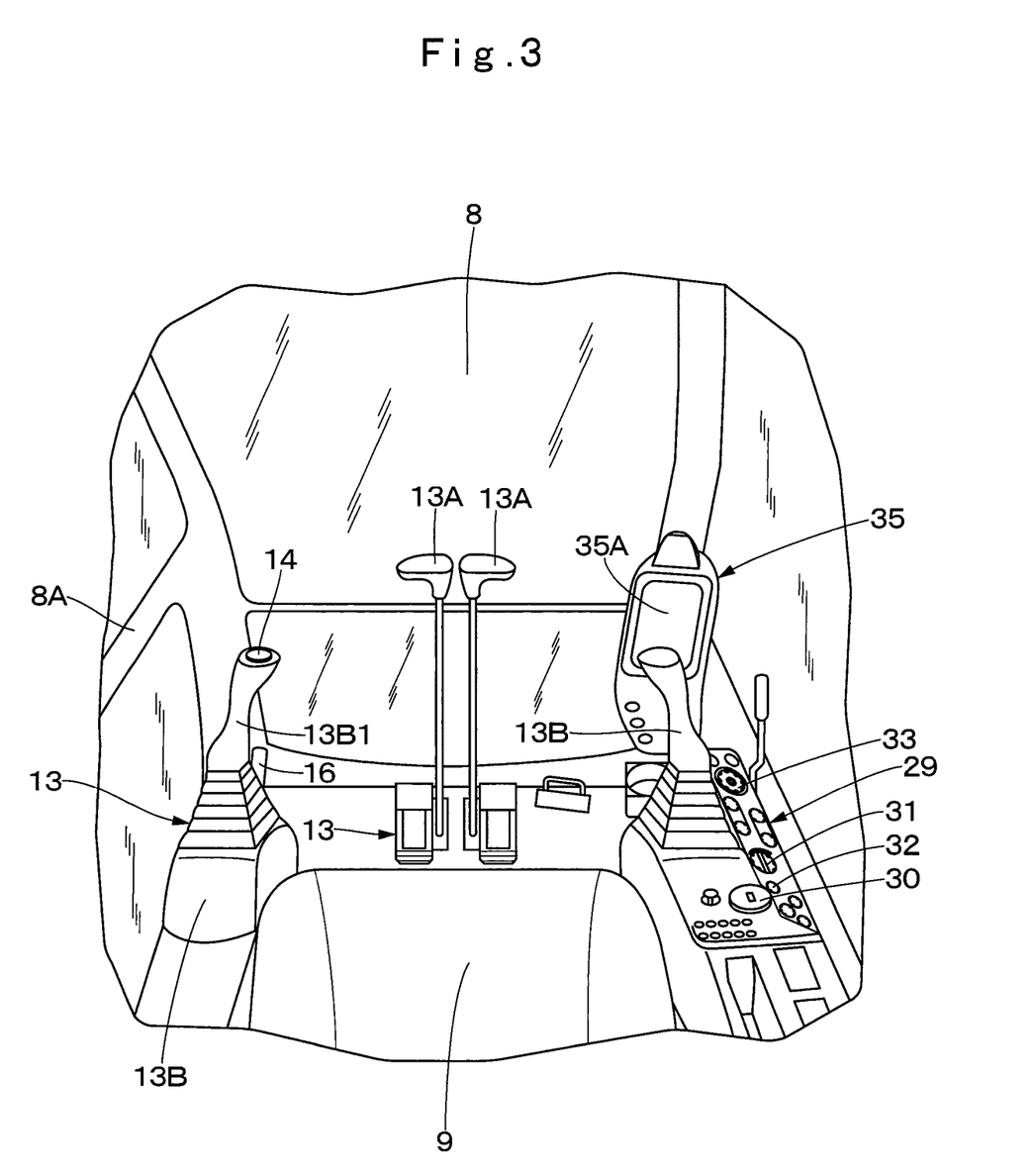
FIG. 3 is a perspective view showing the inner part of the cab from behind.

The operation lever device 13 is configured by including a traveling operation lever pedal 13A located in front of the driver's seat 9, and left and right working operation levers 13B located in both of the left and right sides of the driver's seat 9. The operation lever device 13 outputs an operation signal for operating the hydraulic actuator 19. Specifically, the traveling operation lever pedal 13A is operated at the time of controlling the operation of the traveling hydraulic motor (not shown) for driving drive wheels (not shown) of the lower traveling structure 2.

On the other hand, the left and right working operation levers 13B are operated at the time of controlling operations of a revolving hydraulic motor (not shown) to be driven at the time of revolving the upper revolving structure 3 and the respective cylinders 5G, 5H, 5J, 5K in the offset front device 5. A horn switch 14 is provided in a tip end of a lever 13B1 configuring the working operation lever 13B provided in the left side. The horn switch 14 is pressed down at the time of generating an alarm sound from a later-described alarming device 34 toward the surroundings of the small-sized hydraulic excavator 1 regardless of before start or after start of the engine 10. It should be noted that the horn switch 14 is not limited to the left working operation lever 13B, but may be provided in each of the right working operation levers 13B and the traveling operation lever pedal 13A.

Figure 6:
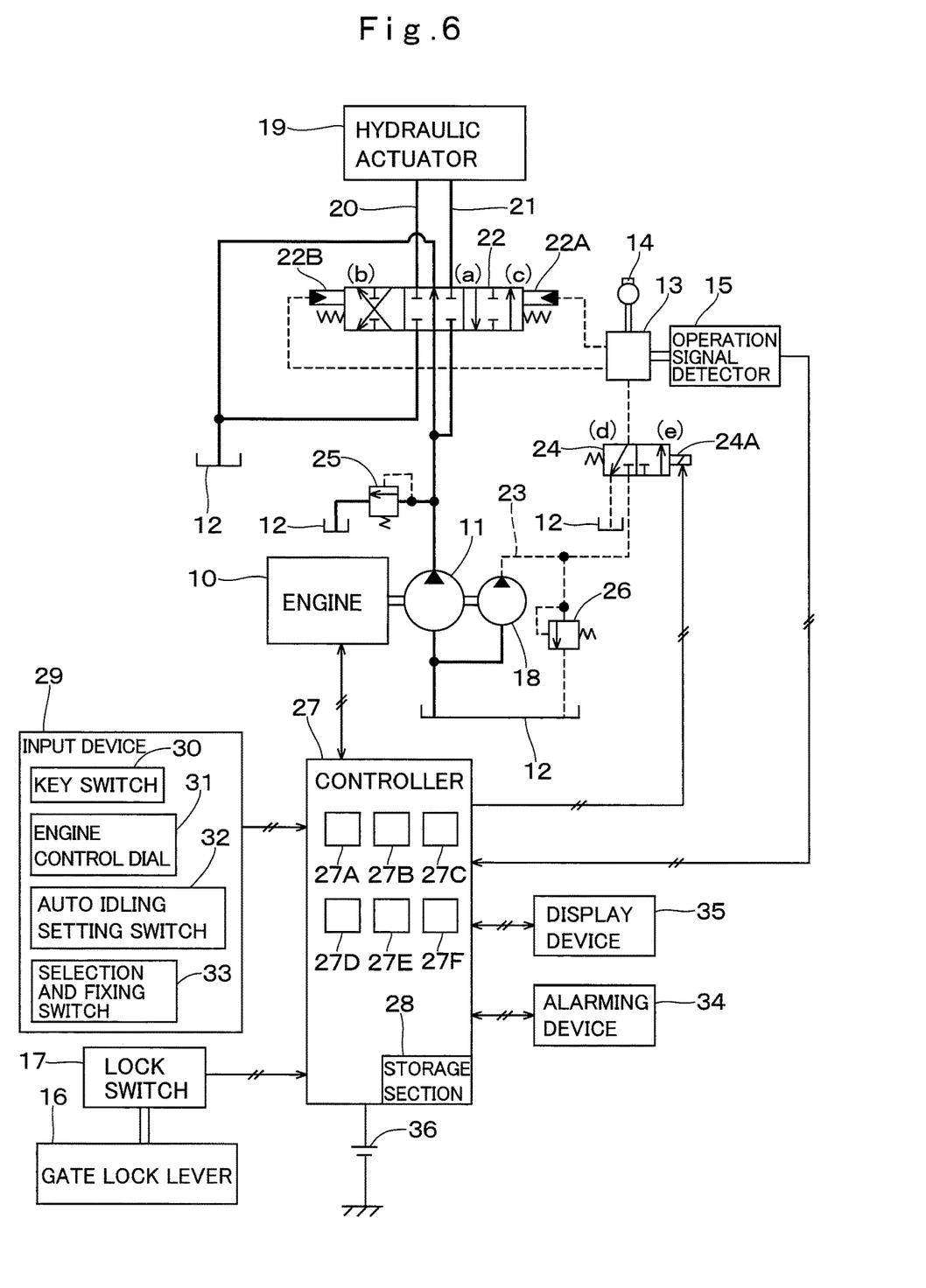
FIG. 6 is a system configuration diagram showing a hydraulic system including a hydraulic pump and an electric control system including a controller.

An operation signal detector 15 is provided in the operation lever device 13 (refer to FIG. 6). The operation signal detector 15 detects whether or not operations to the operation lever device 13 and the horn switch 14 are performed. When the operation lever device 13 and the horn switch 14 are operated, the detection signals are outputted to a later-described controller 27. The controller 27 determines whether or not the operations to the operation lever device 13 and the horn switch 14 are performed based upon the signal from the operation signal detector 15.

The gate lock lever 16 is positioned under the left working operation lever 13B, and is provided in the door 8A-side (an entrance/exit side) of the cab 8. The gate lock lever 16 is operated to a lock position (a raising position) of opening the entrance of the cab 8, and a lock release position (a lowering position) of blocking the entrance of the cab 8 when the operator gets on or gets off the cab 8. The gate lock lever 16 is switched to a lock position of prohibiting a drive of the hydraulic actuator 19 and a lock release position of allowing the drive of the hydraulic actuator 19.

That is, when the gate lock lever 16 is set to the lock position, supply of a pilot pressure to the later-described directional control valve 22 is prohibited. Thereby, the hydraulic actuator 19 does not operate even when the operation lever device 13 is operated. On the other hand, when the gate lock lever 16 is set to the lock release position, the supply of the pilot pressure to the directional control valve 22 is allowed. Thereby, the hydraulic actuator 19 operates based upon the operation of the operation lever device 13.

A lock switch 17 is provided in the gate lock lever 16 (refer to FIG. 6). The lock switch 17 is configured by a mechanical switch in association with the operation of the gate lock lever 16, for example. The lock switch 17 detects that the gate lock lever 16 is set to the lock position, and outputs a detection signal to the controller 27. The controller 27 determines whether the gate lock lever 16 is in the lock position or in the lock release position, based upon the signal from the lock switch 17.

Here, a hydraulic system that controls the operation of the hydraulic actuator 19 and an electric control system that controls the operation of the engine 10 and the like are mounted on the small-sized hydraulic excavator 1. Hereinafter, an explanation will be made of the hydraulic system and the electric control system in the small-sized hydraulic excavator 1 with reference to FIG. 6.

The hydraulic pump 11 configures a hydraulic source together with the hydraulic oil tank 12. A pilot pump 18 configures a pilot hydraulic source together with the hydraulic oil tank 12. The hydraulic pump 11 and the pilot pump 18 are driven by the engine 10.

The hydraulic actuator 19 is connected to the hydraulic source composed of the hydraulic pump 11 and the hydraulic oil tank 12 via main lines 20, 21. In this case, the hydraulic actuator 19 is configured by including the traveling hydraulic motor, the revolving hydraulic motor, the boom cylinder 5G, the offset cylinder 5H, the arm cylinder 5J, and the bucket cylinder 5K.

The directional control valve 22 of a hydraulic pilot type of a 6-port and a 3-position is provided in the course of the main lines 20, 21, for example. The directional control valve 22 is provided individually in each of the traveling hydraulic motor, the revolving hydraulic motor, the boom cylinder 5G, the offset cylinder 5H, the arm cylinder 5J, and the bucket cylinder 5K, which configure the hydraulic actuator 19.

The directional control valve 22 has hydraulic pilot parts 22A, 22B. When the pilot pressure is not supplied to each of the hydraulic pilot parts 22A, 22B, the directional control valve 22 is held in the neutral position (a) to discharge the pressurized oil delivered from the hydraulic pump 11 to the hydraulic oil tank 12. When the pilot pressure is supplied to the hydraulic pilot part 22A or the hydraulic pilot part 22B, the directional control valve 22 is switched to the switch position (b) or the switch position (c). Thereby, the pressurized oil from the hydraulic pump 11 is supplied to the hydraulic actuator 19 via the main lines 20, 21 to operate the hydraulic actuator 19.

The pilot pump 18 and each of the hydraulic pilot parts 22A, 22B of the directional control valve 22 are connected via a pilot line 23. The operation lever device 13 is provided in the course of the pilot line 23. Accordingly, the pilot pressure as an operation signal is selectively supplied to the hydraulic pilot parts 22A, 22B of the directional control valve 22 in response to an operation to the operation lever device 13 (the traveling operation lever pedal 13A and working operation lever 13B).

The pilot line 23 is provided with a block valve 24 between the pilot pump 18 and the operation lever device 13. The block valve 24 is composed of a solenoid valve of a 3-port and a 2-position having a solenoid pilot part 24A, and is switched to a block position (d) where the pilot line 23 is blocked and a communication position (e) where the pilot line 23 is communicated.

The block valve 24 holds the block position (d) when the gate lock lever 16 is in the lock position. In a case where the operation lever device 13 is operated in this state, the supply of the pilot pressure to each of the hydraulic pilot parts 22A, 22B of the directional control valve 22 is prohibited, and the hydraulic actuator 19 becomes in a non-operating state.

On the other hand, when the gate lock lever 16 is switched to the lock release position, the block valve 24 is switched to the communication position (e) by supply of the signal from the controller 27 to the solenoid pilot part 24A. In this case, the pilot pressure is supplied to each of the hydraulic pilot parts 22A, 22B of the directional control valve 22 in response to the operation of the operation lever device 13, and the hydraulic actuator 19 becomes in an operating state.

A main relief valve 25 is provided in the main line 20 (21) between the hydraulic pump 11 and the directional control valve 22. A pilot relief valve 26 is provided in the pilot line 23 between the pilot pump 18 and the block valve 24. The main relief valve 25 opens when a delivery pressure from the hydraulic pump 11 exceeds a set pressure to relieve an excessive pressure to the hydraulic oil tank 12-side.

On the other hand, the pilot relief valve 26 opens when a delivery pressure from the pilot pump 18 exceeds a set pressure to maintain the pilot pressure in the pilot line 23 to be constant. Thereby, the reduced operation pressure in the operation lever device 13 is supplied to the hydraulic pilot parts 22A, 22B as an operation signal.

Next, an explanation will be made of the controller 27 that controls operations of the engine 10, the block valve 24, the later-described alarming device 34, a display device 35, and the like.

The controller 27 is mounted on the small-sized hydraulic excavator 1, and is connected to the engine 10, the operation signal detector 15, the lock switch 17, the block valve 24, the later-described input device 29, the alarming device 34, the display device 35, and the like. The controller 27 is configured by, for example, a microcomputer and the like, and generates control instructions to the engine 10, the block valve 24, the alarming device 34, the display device 35, and the like to execute various kinds of control functions. Specifically, the controller 27 performs rotational speed control of the engine 10, drive control of the block valve 24, alarming generating control of the alarming device 34, screen switch control of the display device 35, and the like.

In addition, when the operation lever device 13 is continuously not operated for a constant time, the controller 27 performs auto idling control of switching the rotational speed of the engine 10 to an idling rotational speed. When the gate lock lever 16 continuously holds the lock position (the raising position) for a constant time, the controller 27 performs engine automatic stop control (idling stop control) for automatically stopping the engine 10.

Therefore, the controller 27 is configured by including a restart standby time determining section 27A, a horn switch operation determining section 27B, a gate lock lever position determining section 27C, a restart preparation time determining section 27D, an engine restart section 27E, and a power supply stopping section 27F. The restart standby time determining section 27A determines an idling stop state. The horn switch operation determining section 27B determines whether or not the horn switch 14 is operated. The gate lock lever position determining section 27C determines whether the gate lock lever 16 is in the lock position or in the lock release position. The restart preparation time determining section 27D determines whether or not a preparation time until the engine 10 restarts has elapsed. The engine restart section 27E restarts the engine 10. The power supply stopping section 27F stops an electric power supply of a vehicle. An explanation will be later made of the details of the idling stop control and the restart control of the engine 10 after the idling stop control by the controller 27.

The controller 27 has a storage section (a memory) 28. An initial setting related to the idling stop control is stored in the storage section 28. In this case, the initial setting related to the idling stop function indicates, for example, a setting on whether to make the idling stop function effective or ineffective, and a setting of time (an idling stop setting time) T1 to a point of causing the engine 10 to stop from a point when the gate lock lever 16 becomes in the lock position (the raising position) when the idling stop function is made effective.

The input device 29 is positioned in the cab 8 to be provided in the right side to the driver's seat 9. The input device 29 is provided with a key switch 30, an engine control dial 31, an auto idling setting switch 32, a selection and fixing switch 33 and the like, and is operated by the operator who sits on the driver's seat 9.

The key switch 30 is operated by using an engine key (not shown) for starting the engine 10. The engine control dial 31 sets a target rotational speed of the engine 10 within a predetermined range in accordance with a rotational position of a dial. The auto idling setting switch 32 sets whether a later-described auto idling function should be made effective or ineffective.

The selection and fixing switch 33 is composed of a dial type switch capable of performing a rotational operation and a pressing operation. The selection and fixing switch 33 is operated for performing, for example, switch of the later-described display device 35, a setting of an air conditioner, a setting of a radio, a setting of a working mode, and the initial setting related to the later-described idling stop function and the like.

The alarming device 34 as a horn is provided on the upper revolving structure 3, and generates an alarming sound toward the surroundings of the small-sized hydraulic excavator 1. The alarming device 34 generates an alarming sound by an operation of the horn switch 14 to urge workers working around the small-sized hydraulic excavator 1 to take precautions. The alarming device 34 is connected to the controller 27, and generates (sounds) alarming sounds by a control signal from the controller 27.

The display device 35 as a monitor is positioned within the cab 8, and is provided in front of the driver's seat 9. The display device 35 is configured by a crystal monitor, for example, and displays a driving situation of the small-sized hydraulic excavator 1 on a screen 35A. The display device 35 is connected to the controller 27, and displays a screen in response to an instruction from the controller 27. Various pieces of information related to the vehicle body such as a remaining amount of fuel, a water temperature of engine cooling water, a working time, and a vehicle compartment temperature are displayed on the display device 35.

The display device 35 displays a target rotational speed of the engine 10 in response to an operation of the engine control dial 31. The display device 35 displays "effective" and "ineffective" of the auto idling function in response to an operation of the auto idling setting switch 32. When the air conditioner, the radio and the working mode are set using the selection and fixing switch 33, the display device 35 displays the respective setting contents.

The operator can perform the initial setting related to the idling stop function by using the selection and fixing switch 33 and the display device 35. When the initial setting related to the idling stop function is performed by using the selection and fixing switch 33, the display device 35 displays the content of the initial setting. That is, the display device 35 displays the setting on whether to make the idling stop function effective or ineffective, a stop determination time T1, a restart standby time T2 and a restart preparation time T3.

Figure 4:
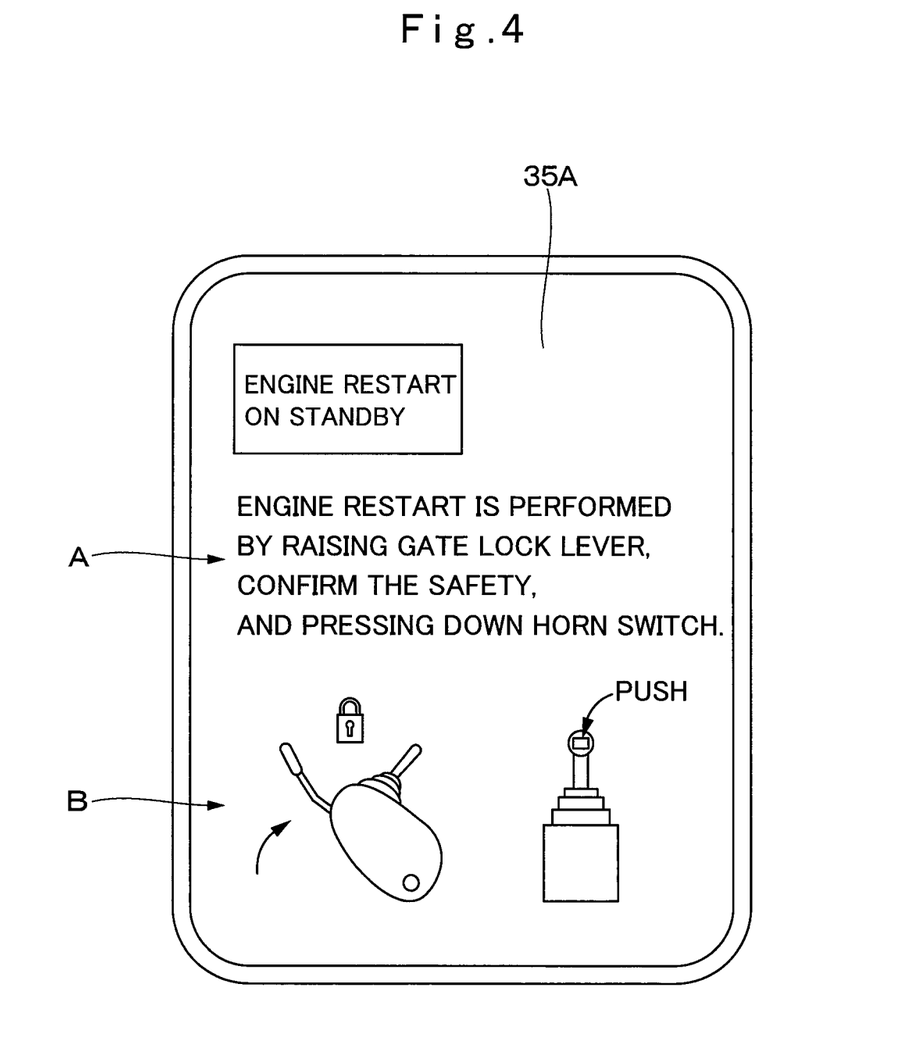
FIG. 4 is a front view showing a state where engine restart on standby and an operation procedure in a case of restarting an engine are displayed on a screen of a display device.
Figure 5:
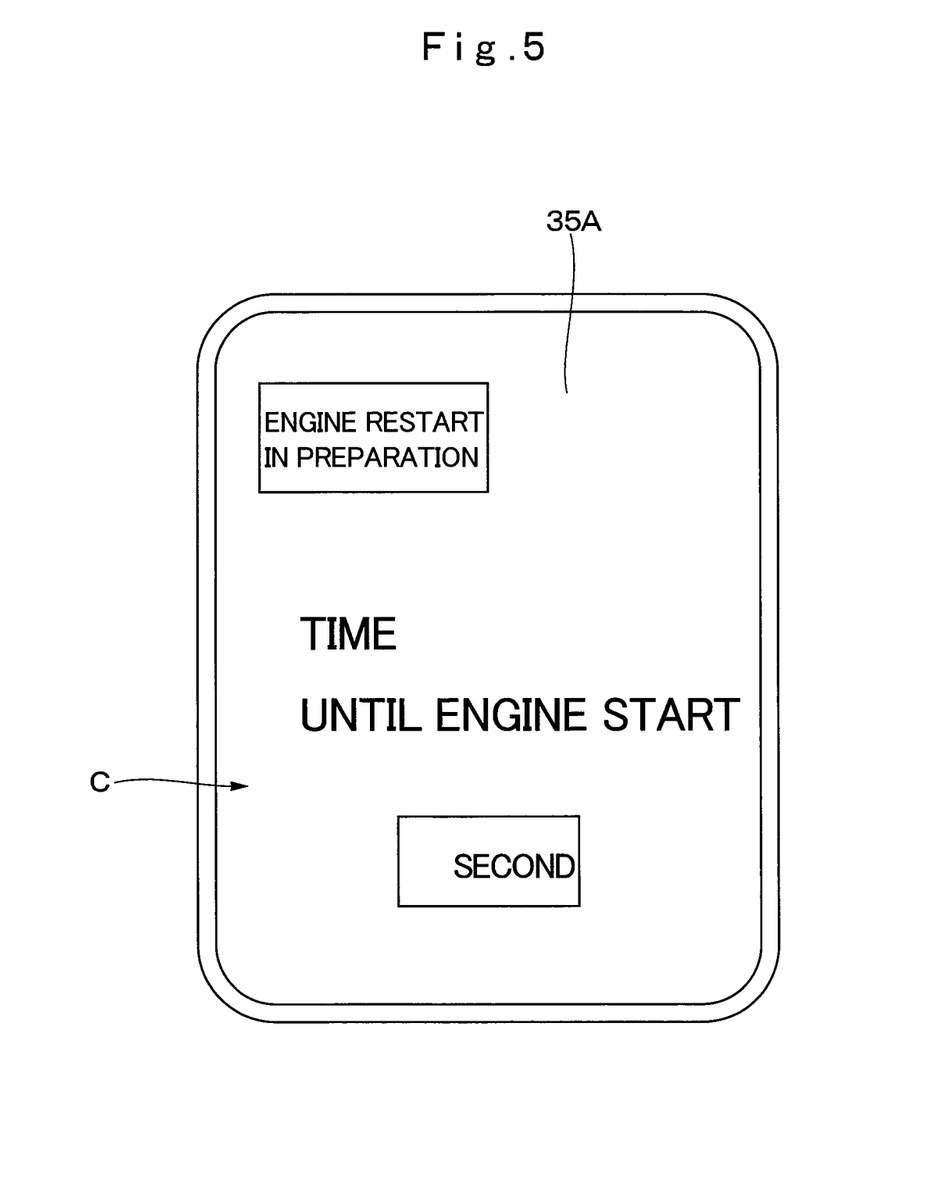
FIG. 5 is a front view showing a state where engine restart in preparation is displayed on the screen of the display device.

As shown in FIG. 4, when it is determined that the restart standby time does not elapse by the restart standby time determining section 27A of the controller 27, the display device 35 displays on the screen 35A the effect of waiting for an operation of the restart of the engine 10. In this case, an operation procedure in a case of performing the restart of the engine 10 is displayed on the screen 35A of the display device 35. As shown in FIG. 5, when it is determined that the restart preparation time does not elapse by the restart preparation time determining section 27D of the controller 27, the display device 35 displays on the screen 35A the effect of being in preparation until the engine 10 restarts.

A battery 36 is an electric power supply of electrical equipment including the engine 10. Specifically, the battery 36 is the electric power supply of electrical equipment for driving (operating) the engine 10, the controller 27, the alarming device 34, the display device 35 and the like. The battery 36 adopts a general lead storage battery as a storage device that stores electrical charge, for example.

Figure 7:
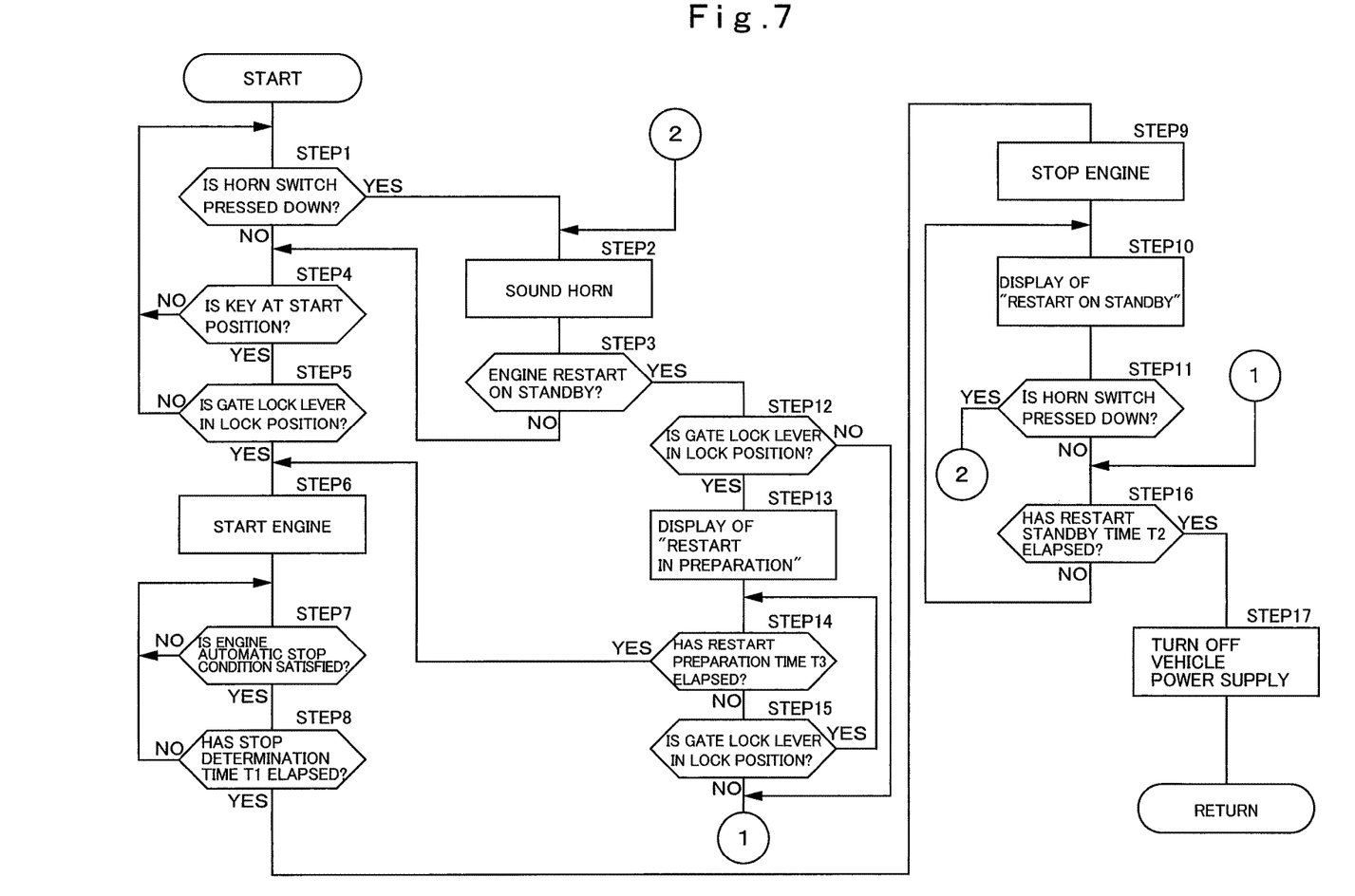
FIG. 7 is a flow chart showing control processing when the controller performs start, automatic stop and restart of the engine.

The small-sized hydraulic excavator 1 according to the present embodiment has the configuration as described above, and next, an explanation will be made of the operation with reference to the control processing of the controller 27 shown in FIG. 7.

First, an explanation will be made of a case where the operator gets in the cab 8 and sits on the driver's seat 9, and then, operates the small-sized hydraulic excavator 1 under power stopping.

At step 1, it is determined whether or not the horn switch 14 is pressed down. That is, for notifying the surroundings the work by the small-sized hydraulic excavator 1 is started, the controller 27 determines whether or not the operator has operated the horn switch 14. In a case where "YES" is determined at step 1, that is, in a case where it is determined that the horn switch 14 is pressed down, the process goes to step 2, wherein the alarming device 34 sounds. On the other hand, in a case where "NO" is determined at step 1, that is, in a case where it is determined that the horn switch 14 is not pressed down, the process goes to step 4.

At step 3, it is determined whether or not the engine 10 is in the engine restart on standby. That is, the controller 27 determines whether or not the engine 10 is in the idling stop state. In this case, since the engine 10 is not in the engine restart on standby, at step 3 "NO" is determined, and the process goes to the next step 4.

At step 4, it is determined whether or not the key switch 30 is in the key start position. That is, the controller 27 determines whether or not the operator has operated the key switch 30 to a start position using an engine key. It should be noted that in a case where "NO" is determined at step 1, that is, even when the horn switch 14 is not operated and the horn does not sound, the process goes to step 4, but it is preferable that, for certainly notifying workers around the small-sized hydraulic excavator 1 of the start of the operation, the horn is caused to sound (at step 2) and then, the process goes to step 4.

In a case where "YES" is determined at step4, that is in a case where it is determined that the key switch 30 is operated in the key start position, the process goes to step 5. On the other hand, in a case where "NO" is determined at step 4, that is, in a case where it is determined that the key switch 30 is not operated in the key start position, the process returns to step 1.

At step 5, it is determined whether or not the gate lock lever 16 is in the lock position (the raising position). That is, the controller 27 defines as a condition of an engine start a state where the gate lock lever 16 is put to the lock position (the raising position) to make the operation of the operation lever device 13 ineffective, for suppressing an unintended operation of the small-sized hydraulic excavator 1.

In a case where "YES" is determined at step 5, that is, in a case where it is determined that the gate lock lever 16 is in the lock position, the process goes to step 6. On the other hand, in a case where "NO" is determined at step 5, that is, in a case where it is determined that the gate lock lever 16 is in the lock release position (the lowering position), the process returns to step 1.

At step 6, the engine 10 is started. In a case where the gate lock lever 16 is operated from the lock position to the lock release position after the start of the engine 10, the controller 27 determines that the gate lock lever 16 is switched to the lock release position by the control signal from the lock switch 17. The controller 27 outputs the control signal to the solenoid pilot part 24A in the block valve 24. Accordingly, the block valve 24 provided in the pilot line 23 is switched from the block position (d) to the communication position (e), and a pilot pressure in response to the operation of the operation lever device 13 is capable of being supplied to the hydraulic pilot part 22A or the hydraulic pilot part 22B in the directional control valve 22.

As a result, in the small-sized hydraulic excavator 1, the pressurized oil from the hydraulic pump 11 is delivered to the hydraulic actuator 19 via the directional control valve 22 in response to the operation to the operation lever device 13. Therefore, the small-sized hydraulic excavator 1 performs the traveling operation by the lower traveling structure 2, the revolving operation by the upper revolving structure 3, and the excavating operation by the offset front device 5. In this case, the operator operates the engine control dial 31 of the input device 29, thus, making it possible to set the engine rotational speed as needed.

In a case where the operation to the operation lever device 13 or the engine control dial 31 is continuously not performed for a specified time (an auto idling setting time) or more, since a signal from the operation signal detector 15 or the engine control dial 31 is not input to the controller 27, the controller 27 performs the auto idling control that lowers the rotational speed of the engine 10. As a result, a wasteful fuel consumption amount can be suppressed, and an exhaust gas, noises and the like can be reduced to improve an environment of the working site.

Next, an explanation will be made of a case where the working is interrupted due to the standby or the like, and the engine 10 is automatically stopped and a case where the engine 10 is restarted.

In this case, it is determined at step 7 whether or not an engine automatic stop condition (that is, an idling stop condition) is satisfied. The engine automatic stop control is control to, assuming the small-sized hydraulic excavator 1 to be in the non-working state when the gate lock lever 16 is operated to the lock position, automatically stop the engine 10 when this non-working state lasts for a specified time.

The engine automatic stop condition is composed of a case where the auto idling setting switch 32 of the input device 29 is turning on (effective), a case where the gate lock lever 16 is in the lock position (the raising position), a case where the engine 10 is not in an overheat state, and a case where particulate matter trapped in a filter in an unillustrated exhaust gas post-treatment device is not during burning off (regeneration). That is, in a case where the start (the drive) of the engine 10 is necessary by the other control, the other control is prioritized and the automatic stop of the engine 10 is not performed.

In a case where "YES" is determined at step 7, that is, in a case where it is determined that the engine automatic stop condition is satisfied, the controller 27 starts to measure time t1, and the process goes to step 8. On the other hand, in a case where "NO" is determined at step 7, that is, in a case where it is determined that the engine automatic stop condition is not satisfied, the controller 27 monitors the engine automatic stop condition until it is satisfied.

At the next step 8, it is determined whether or not the stop determination time T1 has elapsed. That is, the controller 27 determines whether or not the elapse time t1 since the engine automatic stop condition is established is equal to or more than the stop determination time T1 (t1 T1). In this case, the stop determination time T1 may be set to an optional time within, for example, one minute to ten minutes (preferably within three minutes to five minutes) using the display device 35 and the selection and fixing switch 33.

In a case where "YES" is determined at step 8, that is, in a case where it is determined that the time t1 since the engine automatic stop condition is satisfied is equal to or more than the stop determination time T1 (t1≥T1), the process goes to step 9. On the other hand, In a case where "NO" is determined at step 8, that is, in a case where it is determined that the time t1 since the engine automatic stop condition is satisfied does not reach the stop determination time T1 (t1<T1) yet, the process returns to step 7, wherein the controller 27 monitors whether or not the engine automatic stop condition is satisfied, and measures the time t1.

At step 9, the engine 10 is stopped. That is, the controller 27 causes the engine 10 to be in the idling stop state of stopping the engine 10 in a state where the vehicle power supply is turning on. The controller 27 resets the time t1 since the engine automatic stop condition is satisfied, and starts the measurement of time t2 since the engine 10 is stopped.

At the next step 10, "restart on standby" is displayed on the screen 35A of the display device 35. FIG. 4 shows an example of the display of "restart on standby". In this case, by displaying "engine restart on standby" on the upper side of the screen 35A of the display device 35, the effect of waiting for the operation of the restart of the engine 10 is notified. On the screen 35A of the display device 35, the operation procedure necessary for the restart of the engine 10 is displayed by a character display A or by a graphic display B on the lower side of "engine restart on standby". It should be noted that how many minutes are left as the restart standby time (restart standby time T2 minus elapse time t2 seconds after engine automatic stop) may be displayed on the screen 35A.

At step 11, it is determined whether or not the horn switch 14 is pressed down. That is, the controller 27, for notifying workers around of restarting the work by the small-sized hydraulic excavator 1, determines whether or not the operator has operated the horn switch 14. In a case where "YES" is determined at step 11, that is, in a case where it is determined that the horn switch 14 is pressed down, the process goes to step 2, wherein the horn sounds from the alarming device 34, and the process goes to step 3. At step 3 "YES" is determined because of the engine restart on standby, and the process goes to step 12. On the other hand, in a case where "NO" is determined at step 11, that is, in a case where it is determined that the horn switch 14 is not pressed down, the process goes to step 16.

At step 12, it is determined whether or not the gate lock lever 16 is in the lock position (the raising position). That is, the controller 27 defines as a condition of an engine restart a state where the gate lock lever 16 is put to the lock position (the raising position) to make the operation of the operation lever device 13 ineffective. In a case where "YES" is determined at step 12, that is, in a case where it is determined that the gate lock lever 16 is in the lock position, the process goes to step 13. On the other hand, in a case where "NO" is determined at step 12, that is, in a case where it is determined that the gate lock lever 16 is in the lock release position (the lowering position), the process goes to step 16.

At step 13, "restart in preparation" is displayed on the screen 35A of the display device 35. The controller 27 starts the measurement of time t3 corresponding to a preparation time until the engine 10 restarts (restart preparation time T3). That is, the controller 27 switches the display of "restart on standby" displayed on the screen 35A of the display device 35 to the display of "restart in preparation", and starts the measurement of the time t3 on a condition that the horn switch 14 is pressed down in the restart on standby (in the idling stop state) and the gate lock lever 16 is in the lock position. The controller 27 maintains the measurement of the time t2 in the restart on standby.

FIG. 5 shows an example of the display of "restart in preparation". In this case, the effect of waiting for the restart of the engine 10 is notified by displaying "engine restart in preparation" on the upper side of the screen 35A of the display device 35. On the screen 35A of the display device 35, an image C on how many minutes are left until the engine 10 restarts (restart preparation time T3 minus elapse time t3 seconds since the engine restart condition is satisfied) is displayed on the lower side of "engine restart in preparation".

At the next step 14, it is determined whether or not the restart preparation time T3 has elapsed. That is, the controller 27 determines whether or not the elapse time t3 since the engine restart condition is established is equal to or more than the restart preparation time T3 (t3≥T3).

The restart preparation time T3 is set as a retreat time in which workers can retreat in a position capable of preventing contact with the small-sized hydraulic excavator 1 after the workers and the like around the small-sized hydraulic excavator 1 recognize an alarming sound sounding from the alarming device 34. The restart preparation time T3 is set as a confirmation time for certainly confirming that the operator restarts the work of the small-sized hydraulic excavator 1. In this case, the restart preparation time T3 may be set to an optional time within, for example, one second to ten seconds (preferably within two seconds to three seconds) using the display device 35 and the selection and fixing switch 33 as needed.

In a case where "YES" is determined at step 14, that is, in a case where it is determined that the time t3 since the engine restart condition is satisfied is equal to or more than the restart preparation time T3 (t3≥T3), the process goes to step 6, wherein the engine 10 is restarted. The controller 27 resets time t2 in the restart on standby and time t3 since the engine restart condition is satisfied. The controller 27 deletes the display of "restart in preparation" displayed on the screen 35A of the display device 35 to be switched to a predetermined display screen.

Thereafter, the gate lock lever 16 is operated from the lock position (the raising position) to the lock release position (the lowering position), and then, the operation lever device 13 is operated. Thereby, the traveling operation by the lower traveling structure 2, the revolving operation by the upper revolving structure 3, the excavating operation by the offset front device 5 and the like can be performed.

On the other hand, in a case where "NO" is determined at step 14, that is, in a case where it is determined that the time t3 since the engine restart condition is satisfied does not reach the restart preparation time T3 (t3<T3), the process goes to step 15. At step 15, it is determined whether or not the gate lock lever 16 is in the lock position. That is, the controller 27 monitors whether or not a state where the gate lock lever 16 is in the lock position is maintained in the restart in preparation (t3<T3).

In a case where "YES" is determined at step 15, that is, in a case where it is determined that the state where the gate lock lever 16 is in the lock position is maintained, the process returns to step 14, wherein the measurement of the time t3 after the engine restart condition is satisfied continues. On the other hand, in a case where "NO" is determined at step 15, that is, in a case where it is determined that the gate lock lever 16 is operated in the lock release position in the restart in preparation of the engine 10, the process goes to step 16. In this case, the time t3 since the engine restart condition is satisfied is reset.

At step 16, it is determined whether or not the restart standby time T2 has elapsed. That is, the controller 27 determines whether or not the elapse time t2 since the engine restart on standby (the idling stop state) is established is equal to or more than the restart standby time T2 (t2≥T2). In this case, the restart standby time T2 may be set to an optional time within, for example, one minute to twenty minutes (preferably within five minutes to ten minutes) using the display device 35 and the selection and fixing switch 33 as needed.

In a case where "YES" is determined at step 16, that is, in a case where it is determined that the time t2 since the engine restart on standby is established is equal to or more than the restart standby time T2 (t2≥T2), the process goes to step 17. On the other hand, in a case where "NO" is determined at step 16, that is, in a case where it is determined that the time t2 since the engine restart on standby is established does not reach the restart standby time T2 (t2<T2) yet, the process returns to step 10, wherein the controller 27 is monitored whether or not the engine restart condition is satisfied.

At step 17, the vehicle power supply is stopped (turns off). That is, the controller 27 stops the electric power supply of the vehicle for suppressing consumption of power when the time t2 (the idling stop state) since the engine restart on standby is established lasts for a long period of time.

The controller 27 resets the time t2 since the engine restart on standby is established. The controller 27 deletes the display of "restart on standby" displayed on the screen 35A of the display device 35 to be switched to a predetermined display screen and the deletion of the image. It should be noted that, for starting the work of the small-sized hydraulic excavator 1 after the power supply stop, the start of the engine 10 can be performed by operating the key switch 30 from the off position to the start position using the engine key.

Among the controls at step 1 to step 17 to be executed by the controller 27 in this way, step 11 configures the horn switch operation determining section 27B in the present invention. Step 12 and step 15 configure the gate lock lever position determining section 27C in the present invention. Step 14 configures the restart preparation time determining section 27D in the present invention. Step 6 via step 14 configures the engine restart section 27E in the present invention. Step 16 configures the restart standby time determining section 27A in the present invention. Step 17 configures the power supply stopping section 27F in the present invention.

In this way, the present embodiment is configured such that when the gate lock lever 16 is in the lock position during the idling stopping of the engine 10 and the existing horn switch 14 to be used at the regular working is operated, it is possible to restart the engine 10. Thereby, the restart of the engine 10 can be easily performed, and since the alarming sound is generated from the alarming device 34 before the engine restart, it is possible to certainly notify the start of the operation.

In a case where the idling stop state of the engine 10 lasts for a specified time, the electric power supply of the small-sized hydraulic excavator 1 is stopped. Thereby, when the interruption of the work of the small-sized hydraulic excavator 1 lasts for a long period of time, the wasteful consumption of power can be suppressed.

The controller 27 determines whether or not the elapse time t3 since the horn switch 14 is operated at the idling stopping of the engine 10 is equal to or more than the restart preparation time T3 which is set in advance, and in a case where the restart preparation time T3 has elapsed, the engine 10 is restarted. Thereby, since the time from a point of the sounding of the alarming device 34 to a point of the restart of the engine 10 can have allowance, the workers or the like can retreat from the surroundings of the small-sized hydraulic excavator 1, and the operator can confirm the surroundings of the small-sized hydraulic excavator 1 sufficiently.

In a case where the elapse time t2 after automatically stopping the engine 10 by the idling stop function does not reach the restart standby time T2 yet, the controller 27 causes the display device 35 to display the effect of waiting for the operation of the restart of the engine 10 and the operation procedure in a case of performing the restart of the engine 10. Thereby, the operator can confirm the state of the small-sized hydraulic excavator 1 and the procedure at the time of performing the restart of the work (the restart of the engine 10) of the small-sized hydraulic excavator 1 by the display device 35.

In a case where the elapse time t3 after the horn switch 14 is operated does not reach the restart preparation time T3 yet, the controller 27 causes the display device 35 to display the effect of making the preparation until the engine 10 restarts. Therefore, the operator can recognize the time until being capable of restarting the work.

The driver's seat 9 is provided with the operation lever device 13 that outputs the operation signal for operating the hydraulic actuator 19, and the horn switch 14 is provided in the tip end of the lever 13B1 of the operation lever device 13. Therefore, since the operator restarts the engine 10 in a state of sitting on the driver's seat 9 to take a working posture, it is easier for the operator to confirm the situation of the surroundings of the small-sized hydraulic excavator 1.

It should be noted that the aforementioned embodiment is explained by taking a case where, at the time of first starting the engine 10, the start of the engine 10 is made possible even without operating the horn switch 14 ("NO" at step 1), as an example. However, the present invention is not limited thereto, but, may be configured such that, for example, also when the engine 10 is first started, the engine 10 may be absolutely not started without operating the horn switch 14.

The aforementioned embodiment is explained by taking a case where the stop determination time T1, the restart standby time T2 and the restart preparation time T3 can be respectively set as needed by the display device 35 and the selection and fixing switch 33, as an example. However, the present invention is not limited thereto, but, for example, the stop determination time T1, the restart standby time T2 and the restart preparation time T3 may be in advance set (stored) in the storage section 28 in the controller 27.

As shown in FIG. 5, the aforementioned embodiment is explained by taking a case of displaying in numbers how many seconds are left by the time (the restart preparation time) of starting the engine 10, as an example. However, the present invention is not limited thereto, but it may be displayed using a graph and the like, for example. This is similarly applied to the restart standby time.

The aforementioned embodiment is explained by taking a case where the alarming device 34 generates the alarming sound by the control signal from the controller 27 in the processing at step 2, as an example. However, the present invention is not limited thereto, but may be configured such that, for example, the alarming device 34 is connected directly to the battery 36, and the alarming device 34 is subjected to power supply from the battery 36 by an operation of the horn switch 14, causing the alarming device 34 to generate the alarming sound.

The aforementioned embodiment is explained by taking a case of using the single directional control valve 22 as an representative example of the directional control valves that operate the hydraulic actuator 19 composed of the traveling hydraulic motor, the revolving hydraulic motor, the boom cylinder 5G, the offset cylinder 5H, the arm cylinder 5J, the bucket cylinder 5K, and the like in FIG. 6. However, in the present invention, the directional control valves that operate the hydraulic actuator 19 composed of the traveling hydraulic motor, the revolving hydraulic motor, the boom cylinder 5G, the offset cylinder 5H, the arm cylinder 5J, the bucket cylinder 5K, and the like are configured as a control valve block or multiple control valve.

The aforementioned embodiment is explained by taking a case where the vehicle body is configured by the lower traveling structure 2, and the upper revolving structure 3 supported on the lower traveling structure 2 to be capable of revolving thereto, as an example. However, the present invention is not limited to the vehicle body composed of the lower traveling structure 2 and the upper revolving structure 3, and may be applied to a single automotive vehicle body without a revolving structure, for example, as a wheel loader, a road roller or the like.

The aforementioned embodiment is explained by taking a case of the small-sized hydraulic excavator 1 of a cab specification as an example. However, the present invention is not limited thereto, but may be applied to a small-sized hydraulic excavator of a canopy specification, for example. Further, the present invention is not limited to the small-sized hydraulic excavator 1, but may be applied to other construction machines such as middle-sized or large-sized hydraulic excavators, mobile cranes or the like.

DESCRIPTION OF REFERENCE NUMERALS

1: Small-sized hydraulic excavator (Construction machine)
2: Lower traveling structure (Vehicle body)
3: Upper revolving structure (Vehicle body)
9: Driver's seat
10: Engine
11: Hydraulic pump
13: Operation lever device
13B: Left and right working operation lever
13B1: Lever
14: Horn switch
16 Gate lock lever
27 Controller
34 Alarming device (Horn)
35 Display device (Monitor)

The invention claimed is:

1. A construction machine comprising:
   an engine that is mounted on a vehicle body and serves as a prime mover;
   a hydraulic pump that is driven by the engine and delivers pressurized oil;
   a hydraulic actuator driven by the pressurized oil delivered from the hydraulic pump;
   a gate lock lever that is provided in an entrance of a driver's seat of the vehicle body and is configured to switch to a lock position prohibiting a drive of the hydraulic actuator and a lock release position allowing the drive of the hydraulic actuator;
   a controller configured to have an idling stop function of automatically stopping the engine upon an idling stop condition in which the gate lock lever is in the lock position, continued drive of the engine is not necessary and the idling stop condition lasts for a specified time; and
   a horn switch configured to, upon operation thereof, cause a horn to generate a sound to the surroundings of the vehicle body,
   wherein the controller is configured to:
   after the engine is automatically stopped by the idling stop function, the gate lock lever is in the lock position defining a restart condition of the engine,
   in a case where an elapsed time after the engine is automatically stopped by the idling stop function does not reach a preset restart standby time, cause the horn to generate a sound in a state where the horn switch is operated and the gate lock lever is in the lock position and determine whether an elapsed time after the horn switch is operated and the engine restart condition is satisfied is equal to or more than a preset restart preparation time, and upon determining the elapsed time after the horn switch is operated is equal to or more than the preset restart preparation time, restart the engine, and
   in a case where the elapsed time after the engine is automatically stopped by the idling stop function has reached the restart standby time without the horn switch being pressed down, stop a power supply of the vehicle body.

2. The construction machine according to claim 1, further comprising:
   a cab in which the driver's seat is disposed; and
   a display disposed in the cab that is coupled to the controller,
   wherein the controller is configured to cause the display to display information indicating an effect of waiting for an operation of restart of the engine in a case where the elapsed time after the engine is automatically stopped by the idling stop function does not reach the restart standby time.

3. The construction machine according to claim 1, further comprising:
   a cab in which the driver's seat is disposed; and
   a display disposed in the cab that is coupled to the controller,
   wherein the controller is configured to cause the display to display information indicating an operation procedure of performing the restart of the engine in a case where the elapsed time after the engine is automatically stopped by the idling stop function does not reach the restart standby time.

4. The construction machine according to claim 1, further comprising:
   a cab in which the driver's seat is disposed; and
   a display disposed in the cab that is coupled to the controller, wherein the controller is configured to cause the display to display information indicating a preparation until the engine restarts in a case where the elapsed time after the horn switch is operated does not reach the restart preparation time.

5. The construction machine according to claim 1, wherein
   the driver's seat is provided with an operation lever device that outputs an operation signal for operating the hydraulic actuator, and
   the horn switch is provided in a tip end of a lever configuring the operation lever device.

* * * * *